US007619768B2

(12) United States Patent
Lech et al.

(10) Patent No.: US 7,619,768 B2
(45) Date of Patent: Nov. 17, 2009

(54) INFORMATION PROCESSING METHODOLOGY

(75) Inventors: Robert Lech, Jackson, NJ (US); Mitchell A. Medina, Essex Fells, NJ (US); Catherine B. Elias, Plainsboro, NJ (US)

(73) Assignee: Glory Licensing LLC, Charlestown (KN)

( * ) Notice: Subject to any disclaimer, the term of this patent is extended or adjusted under 35 U.S.C. 154(b) by 70 days.

(21) Appl. No.: 11/980,765

(22) Filed: Oct. 31, 2007

(65) Prior Publication Data

US 2008/0292175 A1    Nov. 27, 2008

Related U.S. Application Data

(60) Continuation of application No. 11/723,139, filed on Mar. 16, 2007, now Pat. No. 7,474,434, which is a continuation of application No. 11/401,002, filed on Apr. 10, 2006, now Pat. No. 7,259,887, which is a continuation of application No. 11/108,508, filed on Apr. 15, 2005, now Pat. No. 7,184,162, which is a continuation of application No. 10/704,484, filed on Nov. 6, 2003, now Pat. No. 7,075,673, which is a continuation of application No. 09/458,162, filed on Dec. 9, 1999, now Pat. No. 6,683,697, which is a continuation of application No. 09/044,159, filed on Mar. 19, 1998, now Pat. No. 6,094,505, which is a continuation of application No. 08/487,150, filed on Jun. 7, 1995, now Pat. No. 5,768,416, which is a division of application No. 08/348,224, filed on Nov. 28, 1994, now Pat. No. 5,625,465, which is a continuation of application No. 08/143,135, filed on Oct. 29, 1993, now Pat. No. 5,369,508, which is a continuation of application No. 07/672,865, filed on Mar. 20, 1991, now Pat. No. 5,258,855.

(51) Int. Cl.
*H04N 1/40* (2006.01)
(52) U.S. Cl. .................... 358/1.15; 382/180

(58) Field of Classification Search ........... 358/1.15; 382/175, 177, 180, 282, 287, 306, 317
See application file for complete search history.

(56) References Cited

U.S. PATENT DOCUMENTS 3,013,718 A    12/1961    Shepard et al.

(Continued)

FOREIGN PATENT DOCUMENTS

| EP | 0 107 083 B1 | 7/1988 |
|----|----|----|
| JP | 64-38883 | 2/1989 |
| JP | 3-161886 | 7/1991 |

OTHER PUBLICATIONS

R. G. Casey, "Intelligent Forms Processing—technical," pp. 001-012.

(Continued)

*Primary Examiner*—Thomas D Lee
*Assistant Examiner*—Stephen M Brinich
(74) *Attorney, Agent, or Firm*—Foley & Lardner LLP

(57) ABSTRACT

An information processing methodology gives rise to an application program interface which includes an automated digitizing unit, such as a scanner, which inputs information from a diversity of hard copy documents and stores information from the hard copy documents into a memory as stored document information. Portions of the stored document information are selected in accordance with content instructions which designate portions of the stored document information required by a particular application program. The selected stored document information is then placed into the transmission format required by a particular application program in accordance with transmission format instructions. After the information has been transmission formatted, the information is transmitted to the application program. In one operational mode, the interface interactively prompts the user to identify, on a display, portions of the hard copy documents containing information used in application programs or for storage.

28 Claims, 15 Drawing Sheets

U.S. PATENT DOCUMENTS

| | | |
|---|---|---|
| 3,200,372 A | 8/1965 | Hamburgen |
| 3,303,463 A | 2/1967 | Hamburgen |
| 3,434,110 A | 3/1969 | Bucklin, Jr. et al. |
| 3,492,653 A | 1/1970 | Fosdick et al. |
| 3,582,883 A | 6/1971 | Shepard |
| 3,582,884 A | 6/1971 | Shepard |
| 3,584,144 A | 6/1971 | Shepard et al. |
| 3,631,396 A | 12/1971 | Spertus |
| 3,832,682 A | 8/1974 | Brok et al. |
| 3,848,228 A | 11/1974 | MacNeill |
| 3,903,517 A | 9/1975 | Hafner |
| RE29,104 E | 1/1977 | Shepard |
| 4,021,777 A | 5/1977 | Shepard |
| 4,034,343 A | 7/1977 | Wilmer |
| 4,041,454 A | 8/1977 | Shepard et al. |
| 4,047,154 A | 9/1977 | Vitols et al. |
| 4,132,978 A | 1/1979 | Mercier |
| 4,387,964 A | 6/1983 | Arrazola et al. |
| 4,460,975 A | 7/1984 | Torkelsen et al. |
| 4,553,261 A | 11/1985 | Froessl |
| 4,559,614 A | 12/1985 | Peek et al. |
| 4,564,752 A | 1/1986 | Lepic et al. |
| 4,572,962 A | 2/1986 | Shepard |
| 4,593,367 A | 6/1986 | Slack et al. |
| 4,659,940 A | 4/1987 | Shepard |
| 4,667,248 A | 5/1987 | Kanno |
| 4,672,678 A | 6/1987 | Koezuka et al. |
| 4,734,858 A | 3/1988 | Schlafly |
| 4,760,246 A | 7/1988 | Shepard |
| 4,760,606 A | 7/1988 | Lesnick et al. |
| 4,776,016 A | 10/1988 | Hansen |
| 4,782,509 A | 11/1988 | Shepard |
| 4,802,104 A | 1/1989 | Ogiso |
| 4,802,231 A | 1/1989 | Davis |
| 4,803,348 A | 2/1989 | Lohrey et al. |
| 4,803,734 A | 2/1989 | Onishi et al. |
| 4,890,279 A * | 12/1989 | Lubarsky ............... 370/249 |
| 4,901,342 A * | 2/1990 | Jones ................. 379/93.05 |
| 4,931,957 A | 6/1990 | Takagi et al. |
| 4,933,979 A | 6/1990 | Suzuki et al. |
| 4,974,260 A | 11/1990 | Rudak |
| 4,992,940 A | 2/1991 | Dworkin |
| 5,017,763 A | 5/1991 | Shepard |
| 5,021,995 A | 6/1991 | Quint et al. |
| 5,031,121 A | 7/1991 | Iwai et al. |
| 5,034,990 A | 7/1991 | Klees |
| 5,052,038 A | 9/1991 | Shepard |
| 5,095,445 A | 3/1992 | Sekiguchi |
| 5,140,139 A | 8/1992 | Shepard |
| 5,140,650 A | 8/1992 | Casey et al. |
| 5,153,927 A | 10/1992 | Yamanari |
| 5,159,667 A | 10/1992 | Borrey et al. |
| 5,175,684 A | 12/1992 | Chong |
| 5,191,525 A | 3/1993 | LeBrun et al. |
| 5,218,539 A | 6/1993 | Elphick et al. |
| 5,228,100 A | 7/1993 | Takeda et al. |
| 5,241,464 A | 8/1993 | Greulich et al. |
| 5,245,166 A | 9/1993 | Shepard |
| 5,247,591 A | 9/1993 | Baran |
| 5,251,268 A | 10/1993 | Colley et al. |
| 5,257,328 A | 10/1993 | Shimizu |
| 5,258,855 A | 11/1993 | Lech et al. |
| 5,282,267 A | 1/1994 | Woo, Jr. et al. |
| 5,307,424 A | 4/1994 | Kuehl |
| 5,319,542 A | 6/1994 | King, Jr. et al. |
| 5,347,632 A | 9/1994 | Filepp et al. |
| 5,367,619 A | 11/1994 | Dipaolo |
| 5,404,294 A | 4/1995 | Karnik |
| 5,416,849 A | 5/1995 | Huang |
| 5,444,840 A | 8/1995 | Froessl |
| 5,448,738 A | 9/1995 | Good et al. |
| 5,452,379 A | 9/1995 | Poor |
| 5,455,875 A | 10/1995 | Chevion et al. |
| 5,506,697 A | 4/1996 | Li et al. |
| 5,511,135 A | 4/1996 | Rhyne et al. |
| 5,526,447 A | 6/1996 | Shepard |
| 5,550,930 A | 8/1996 | Berman et al. |
| 5,555,325 A | 9/1996 | Burger |
| 5,696,854 A | 12/1997 | Shepard |
| 5,734,761 A | 3/1998 | Bagley |
| 5,852,685 A | 12/1998 | Shepard |
| 5,923,792 A | 7/1999 | Shyu et al. |
| 5,933,531 A | 8/1999 | Lorie |
| 6,067,517 A | 5/2000 | Bahl et al. |
| 6,094,505 A | 7/2000 | Lech et al. |

OTHER PUBLICATIONS

B. T. Perry et al., "Experience gained in implementing ImagePlus—technical," pp. 001-018.

Proposed Alliance Business Case, IBM (Australia) Ltd. And Tower Technology Pty. Ltd., Dec. 1989, 40 pages.

Tower Technology Pty. Ltd., "Private Placement Document," May, 1988, 27 pages.

Letter dated Jun. 20, 1988 to F.W. Johnson, 7 pages.

Facsimile to R. Ingliss with attachment, Tower Technology Pty., Ltd., Aug. 31, 1988, 6 pages.

Answers.com, Prodigy Communications Corporation, http://ww.answers.com/topic/prodigy-communications-corporation?cat..., Jun. 28, 2007, pp. 1-3.

*PC Magazine*, vol. 5, No. 16, Sep. 30, 1986.

*TopScan Professional User's Guide*, Calera Recognition Systems, pp. v-vii, xi-xiii, and 1-6, 1989.

Que's Computer user's Dictionary, $2^{nd}$ Ed., Bryan Pfaffenberger (author); 1991; p. 144.

"Kurzweil 5200 Intelligent Scanning System", Xerox Imaging Systems, inc., 1990.

Edward O. Welles, *Decisions, Decisions*, Inc., Aug. 1990, pp. 80-90.

Palantir PagePro User's Guide, Rev. A, Dec. 1986, sections 1 and 4 and Appendix C.

PageRead Library Developer's Guide, Rev. B, Aug. 1989, pp. PRL1-3, SHC25-26, TUT9-10.

*With AutoClass there is no more to Indexing than OCR*, Remittance and Document Processing Today, Nov.-Dec. 1990, p. 46.

Daniel Borrey, *Machine Recognition and Classification of Documents*, Remittance and Document Processing Today, Nov.-Dec. 1990, pp. 20-23.

*The Very Best in Optical Character Recognition*, Imaging, Mar. 1992, pp. 43-47.

*Why Insurance Companies Take the Risk on Document Imaging*, Imaging, Mar. 1992, pp. 48-54.

"OCR for Forms" (advertisement), Imaging, Apr. 1992.

David Black, *The Right and The Wrong Ways to Index*, Imaging, May 1992, pp. 47-50.

Greg Bartels, *How to Successfully Convert Your Backfiles*, Imaging, May 1992, pp. 55-56.

*But, Is It a Boy or Girl?* Imaging, Oct. 1992, p. 10.

Gerry Frieser, *Suddenly, OCR is a "Must Buy"*, Imaging, Dec. 1992, pp. 22-25.

*14 of the Hottest OCR Software Packages and Systems*, Imaging, Dec. 1992, pp. 26-31, 33, 35.

*How Form Processing Works, Plus Pros and Cons*, Imaging, Dec. 1992, p. 36.

*Forms Processing Products Meet the Challenge of OCRing Forms*, Imaging, Dec. 1992, p. 38-40.

Herbert F. Schantz, *Forms Automation and Integrated Imaging (OCR) Systems*, Remittance and Document Processing Today, Mar.-Apr. 1991, pp. 9-11.

Don Merz, *OCR: A Health Insurance Application*, Remittance and Document Processing Today, Jul.-Aug. 1989, pp. 18-20.

*Industry News*, Remittance and Document Processing Today, Jul.-Aug. 1989, p. 22.

*Industry News* and *New Products*, Remittance and Document Processing Today, Oct. 1984, pp. 17-18.

R. C. Gonzalez, *Designing Balance Into An OCR System*, Remittance and Document Processing Today, Mar. 1988, pp. 7, 10-11.

Ambrose R. Rightler, *OCR Quality Control Procedures for Remittance Processing: Can You Afford to be Without It?* Remittance and Document Processing Today, Mar. 1988, pp. 12-15.

*Product Watch*, MacWeek, Oct. 3, 1989, pp. 32, 34, 38, 40, 42.

*Industry News*, Remittance and Document Processing Today, Jan. 1989, p. 9.

Scott Beamer, *Mac OCR Takes a Big Step Forward*, MacWeek, Jun. 13, 1989.

Matthew Lake, *Strength of Character (Recognition)*, Publish, Jan. 1991, pp. 62-67.

R. David Nelson and Karen A. Hamill, *Optical Scanning at Chemical Abstracts Service for Building Computer Files From Printed Index Data*, Recognition Technologies Today, Feb. 1985, pp. 1-6, 15.

Gerald Farmer, *HNC IDEPT9 and Recognition Enhanced Data Entry: The Cost-Cutting Approach to Automaated Data Entry*, Remittance and Document Processing Today, Jan.-Feb. 1991, pp. 24-26.

David Gertler, *Automated Data Entry*, Seybold Report on Desktop Publishing, Jan. 15, 1990, pp. 3-17.

Eric Aas and Peter Davidoff, *Teaching Your Scanner to Read*, Personal Publishing, May 1990, pp. 28, 31, 33.

Phillip Robinson et al., *Character Witnesses*, MacUser, Jul. 1990, pp. 120-136.

Brita Meng, *Text Without Typing*, MacWorld, Oct. 1990, pp. 177-183.

Jim Heid, *Getting Started with Optical Character Recognition*, MacWorld, Oct. 1990, pp. 297-301.

Stanford Diehl and Howard Eglowstein, *Tame the Paper Tiger*, Byte, Apr. 1991, pp. 220-238.

Alan Joch and Rich Graham, *Voices of Experience*, Byte, Apr. 1991, pp. 239-241.

Gregory Boleslavsky and Roman Tutunikov, *The New Generation of OCR*, Inform, Jan. 1990, pp. 34-37.

Calera Recognition Systems, Inc., TopScan Professional User's Guide: Complete Document Recognition for PCs and Compatibles (1989).

Calera Recognition Systems, Inc., TopScan Professional Installation Notes for Scanners, Fax Cards, and System Configuration (1989).

Calera Recognition Systems, Inc., TopScan Professional Troubleshooting Guide (1989).

Xerox Imaging Systems, Inc., Datacopy AccuText User's Guide (1989).

Invoice from Corporate Intelligence Corporation to Workman, Nydegger & Seeley, dated Sep. 21, 1999.

Examiner Interview Summary Record, Jan. 25, 1996, and related Amendment, for U.S. Appl. No. 08/097,131.

Jane B. Newman, Formstar Ad; "Stack the Facts, Not the Forms"—May 24, 1987; "Stack and Send Just the Facts—and Improve the Efficiency of your Forms Application".

TeleImage Systems Document and Image Database Systems User's Manual- Ramat Gan, Israel; Table of Contents and pp. 2-1 through 5-20.

Form Out! Programmer's Manual; TeleImage Systems, Ramat Gan Israel; published Feb. 1991 pp. I, II, III, IV, V, VI, VII; 1.1-6.29 and A.1-G.11.

OCR Texiris, Texiris User'S Guide, Version 2.1, Image Recognition Integrated systems S.A.

Texiris User's Guide, 13. Interfacing Data Base Management Systems.

Texiris User's Guide, 5. Correction Tools.

Iplexus, "The Extended Data Processing Concept", Plexus Computers, Ltd., 1988.

LaserFiche United, Capabilities and Functional Specifications, 2002 Compulink Management Center, Inc.

The LaserFiche™ System, LF00007-LF00010, Copyright 1998 Compulink Management Center.

LaserFiche™, Integrated Document Imaging and Text Processing Systems, Compulink Management Center, Inc.

Compulink Management Center, Copyright 1989, LF-00006.

PC Week, Document-Archival System Combines DOS with CD ROM, LF00011-LF-00032.

LaserFiche, Zone OR Plug-in, 2002 Compulink Management Center, Inc.

LaserFiche, Efficient Integration, http://www.laserfiche.com/products/techadmin/integration.html, Jul. 2, 2004.

LaserFiche, Inteator's Toolkit, Compulink Management Center, Inc. 2003.

LaserFiche, LaserFiche Integration Express-GIS™, http://www.laserfiche.com/products/integrationexpress-gis.html, Jul. 2, 2004.

"U.S. District Court Western District of Washington, Order", Mar. 4, 2009, pp. 1-22.

"Notice of Appeal to the U.S. Court of Appeals for the Federal Circuit", Apr. 14, 2009, pp. 1-2.

"Getting Started With HyperCard IIGS," last modified on Jul. 2, 1991, pp. 1-156.

Calera Recognition Systems, "PageReadLibrary," Rev. 1989.

D. Tsichritzis, "Applications: Operation and Management—Form Management," Communications of the ACM, vol. 25, No. 7, Jul. 1982, pp. 453-478.

G. Farmer, "HNC IDEPT™ and Recognition Enhanced Data Entry: The Coat-Cutting Approach to Automated Data Entry," Remittance and Document Processing Today, vol. 13, No. 5, Jan.-Feb. 1994.

IBM, "The History of Notes and Domino," Dec. 20, 2005, Updated Nov. 14, 2007, no page numbers.

L. Cardelli, "Building User Interfaces by Direct Manipulation," ACM, 1988, pp. 152-166.

N. Low, "Data Consolidation and Reporting for the Analytical Laboratory," Waste Testing and Quality Assurance: Second Volume, ASTM STP 1062, 1990, pp. 441-454.

Pro/Series, "PagePro Easy-to-Use Page Definition Software—PagePro Overview," Rev. Dec. 1996, pp. 1-1, 1-2, 4-1 to 4-4.

R. Khare et al., "XML: A Door to Automated Web Applications," IEEE Internet Computing, Jul.-Aug. 1977, 9 pgs.

R. Purvey et al., "The Design of Star's Records Processing: Data Processing for the Noncomputer Professional," ACM Transactions on Office Information Systems, vol. 1, No. 1, Jan. 1983, pp. 3-24.

S. Yao et al., "Formanager: An Office Forms Management System," ACM Transactions on Office information Systems, vol. 2, No. 3, Jul. 1984, pp. 236-262.

Seybold, "Report on Desktop Publishing," vol. 4, No. 5, Jan. 15, 1990, pp. 3-17.

TopScan Professional, "User's Guide Complete Document Recognition for PCs and Compatible," Chapter 4, pp. 61-87, Chapter 9, pp. 205-238.

V.Y. Lum et al., "A General Methodology for Data Conversion and Restructuring," Data Conversion, Sep. 1976, pp. 483-497.

Zone List File Format, Appendix C, Rev. Dec. 1996, pp. C-1 and C-2.

* cited by examiner

FIG. 11

| Variable Name | Value |
| --- | --- |
| Vendor | XYZ Corporation |
| Heading 2 | 2 |
| Mail To | XYZ Corporation<br>PO Box 567<br>Anywhere, NY  63130 |
| Account Number | 123456789 |
| Statement Date | 12/01/86 |
| Payment Date | 1/01/87 |
| Previous Balance | $1234.56 |
| New Charges | $789.01 |
| Debits | |
| Finance Charges | $2.34 |
| Payments | $1000.00 |
| Other Credits | |
| New Balance | $1025.91 |

FIG. 12A

| Variable Name | Value |
|---|---|
| Vendor | XYZ Corporation |
| Account Number | 123456789 |
| Statement Date | 12/01/86 |
| Payment Date | 1/01/87 |
| Previous Balance | $1234.56 |
| New Charges | $789.01 |
| Debits | |
| Finance Charges | $2.34 |
| Payments | $1000.00 |
| New Balance | $1025.91 |

FIG. 12B

| Variable Name | Value |
|---|---|
| Mail To | XYZ Corporation<br>PO Box 567<br>Anywhere, NY  63130 |
| Previous Balance | $1234.56 |

FIG. 12C

| Variable Name | Value |
|---|---|
| Mail To | XYZ Corporation<br>PO Box 567<br>Anywhere, NY  63130 |
| Previous Balance | $1234.56 |

FIG.13A
$$\begin{cases} > 1 > 1 > 1 > \text{"XYZ Corporation"} \\ > 2 > 2 > 25 > + 123456789 > \\ > 3 > 2 > 1 > D12/01/86 > \\ > 4 > 2 > 11 > D12/15/86 > \\ > 5 > 2 > 21 > D01/01/87 > \\ > 6 > 10 > 25 > \$1234.56 > \\ > 7 > 11 > 25 > \$789.01 > \\ > 8 > 13 > 25 > \$2.34 > \\ > 9 > 14 > 25 > \$1000.00 > \\ > 10 > 16 > 25 > \$1025.91 > \end{cases}$$

FIG.13B
$$\begin{cases} > 1 > 1 > 1 > \$1234.56 > \\ > 2 > 2 > 1 > \text{"XYZ Corporation"} \\ > 3 > 3 > 1 > \text{"PO Box 567"} \\ > 4 > 4 > 1 > \text{"Anywhere, NY 63130"} \end{cases}$$

FIG.13C
$$\begin{cases} /1/1/1/\$1234.56// \\ /2/2/1/\text{*XYZ Corporation*} \\ /3/3/1/\text{*PO Box 567*} \\ /4/4/1/\text{*Anywhere, NY 63130*} \end{cases}$$

— 20

XYZ Corporation

Customer

ABC Corporation
123 Sixteenth Street
Hometown, NJ 88981

Mail To:

△ XYZ Corporation
PO Box 567
Anywhere, NY 63130 △

Account Number    123456789

Statement Date:    O 12/01/86 O

Payment Date:    1/01/87

Previous Balance    $1234.56

New Charges    ☐ $789.01 ☐

Other Debits

Finance Charges (10%)    $2.34

Payments    $1000.00

Other Credits

New Balance    $1025.91

WINTER SALE IN EFFECT THROUGHOUT JANUARY:
30

INFORMATION PROCESSING METHODOLOGY

This application is a continuation of application Ser. No. 11/723,139, filed Mar. 16, 2007, which is a continuation of application Ser. No. 11/401,002, filed Apr. 10, 2006, which is a continuation of application Ser. No. 11/108,508, filed Apr. 15, 2005, which is a continuation of Ser. No. 10/704,484, filed Nov. 6, 2003, which is a continuation of application Ser. No. 09/458,162, filed Dec. 9, 1999 (now U.S. Pat. No. 6,683,697), which is a continuation of application Ser. No. 09/044,159, filed Mar. 19, 1998 (now U.S. Pat. No. 6,094,505), which is a continuation of application Ser. No. 08/487,150, filed Jun. 7, 1995 (now U.S. Pat. No. 5,768,416), which is a divisional of Ser. No. 08/348,224, filed Nov. 28, 1994 (now U.S. Pat. No. 5,625,465), which is a continuation of Ser. No. 08/143,135, filed Oct. 29, 1993 (now U.S. Pat. No. 5,369,508), which is a continuation of Ser. No. 07/672,865, filed Mar. 20, 1991 (now U.S. Pat. No. 5,258,855).

BACKGROUND OF THE INVENTION

The invention is directed to a system for efficiently processing information originating from hard copy documents. More specifically, the invention is directed to a hard copy document to application program interface which minimizes the need to manually process hard copy documents.

In the past, information contained on hard copy documents was manually entered into a computer via the input controller of a particular computer. The original document was then filed away for future reference. Automatic input of data was limited to the input of Magnetic Ink Character Recognition (MICR) data and to optical Character Recognition (OCR) data. This fixed-position data was forwarded directly to a dedicated computer application specifically designed to accommodate the input format. In more recent years, typewritten text has been mechanically inputted into a computer via a text file. Examples of this latter type of system are word processors and photo-typesetters.

These conventional systems have limitations which decrease the efficiency of processing information from a hard copy document. For example, the systems discussed above are limited in their application to MICR, OCR, or typewritten data. Parsing and processing data is limited to the particular requirements of the particular computer application which requires the input data. In addition, in these conventional systems, the actual hard copy document must be retained for future reference at great expense.

In a sophisticated computer network, different users may require different portions of the information contained on a hard copy document. For example, if the hard copy document is an invoice returned with payment of a bill, the accounting department may need all of the monetary information contained on the bill while the mailroom may need only customer address information, to update a customer's address. Therefore, there is a need for a system in which specific information from a hard copy document can be selectively distributed to various users.

Another problem with conventional systems is that users, even within the same company, may require that the information extracted from a hard copy document be transmitted to a particular application program in a specific transmission format. For example, one department in a company may use a particular application program which must receive information using a particular character as a delimiter and other departments may require the information in a different format using different delimiters.

Another problem, particularly for small businesses, is that current systems can not efficiently accommodate the inputting of information from a diversity of hard copy documents. A large business which receives many forms in the same format can afford a system which inputs a high volume of information in that format into memory. For example, it is cost-effective for a bank which processes hundreds of thousands of checks a month to buy a dedicated machine which can read information off of checks having a rigidly defined, or fixed, format. However, as the diversity of forms received by a business increases relative to the number of forms that must be processed, it becomes less cost-effective to design a dedicated machine for processing each type of form format. This problem is particularly significant in small businesses which may, for example, receive fifty invoices a month, all in different, non-fixed, formats. It is frequently not cost-effective for a small business to design dedicated systems for inputting information in each of these various formats. This leaves a small business with no other practical alternative than to manually input the information off of each invoice each month.

SUMMARY OF THE INVENTION

It is an object of the invention, therefore, to provide an application program interface which allows a user to select specific portions of information extracted from a diversity of hard copy documents and allows the user to direct portions of this information to several different users in accordance with the needs of the particular user.

It is also an object of the invention to provide a cost-effective system for inputting hard copy documents which can accommodate hard copy documents in a diversity of formats.

It is another object of the invention to provide an application program interface which is allows a user to put information, which is to be transmitted, into a particular transmission format, based upon the needs of the receiver of the information.

It is a further object of the invention to provide an application program interface which will allow the extraction, selection, formatting, routing, and storage of information from a hard copy document in a comprehensive manner such that the hard copy document itself need not be retained.

It is another object of the invention to provide a system which reduces the amount of manual labor required to process information originating from a hard copy document.

A further object of the invention is to reduce the time required to process information originating from a hard copy document so that a higher volume of transactions involving hard copy documents can be processed.

The invention provides an application program interface which inputs a diversity of hard copy documents using an automated digitizing unit and which stores information from the hard copy documents in a memory as stored document information. Portions of the stored document information are selected in accordance with content instructions which define portions of the stored document information required by a particular application unit. Selected stored document information is then formatted into the transmission format used by the particular application program based on transmission format instructions. The transmission formatted selected stored document information is then transmitted to the particular application program. The hard copy documents may contain textual information or image information or both.

The interface operates in three different modes.

In a first mode, the interface extracts all of the information from hard copy documents and stores this information in memory. Parsing of various portions of the extracted information is performed in accordance with content instructions.

In a second mode, the user operates interactively with the interface by use of a display and an input device, such as a mouse. In this second mode, a hard copy document is inputted and displayed on the display. The interface then prompts the user to identify the location of various information. For example, the interface can ask the user to identify the location of address information on the hard copy document. In response, the user positions the mouse to identify address information using a cursor. The identified information is then stored as address information in memory. Subsequently, the interface again prompts the user to identify other pieces of information, which are then stored in the appropriate locations in memory. This process proceeds until all of the information which is desired to be extracted off of the hard copy document is stored in memory.

In a third mode of operation, selected portions of information are extracted off of hard copy documents in accordance with predetermined location information which has been specified by the user. For example, the user can define a template which specifies the location of information on hard copy documents. Templates can be formed in conjunction with second mode operation. Alternatively, the user can instruct the interface to search hard copy documents for a particular character or symbol, located on the hard copy documents. The information desired to be extracted off of the hard copy documents is specified relative to the location of this character or symbol.

The interface can also prompt or receive from an applications program or another information processing system, required information, content instructions, and format instructions.

Other objects, features, and advantages of the invention will be apparent from the following detailed description of the invention.

BRIEF DESCRIPTION OF THE DRAWINGS

The invention will be described in further detail below with reference to the accompanying drawings, in which:

FIG. 11 lists data corresponding to the hard copy document of FIG. 2;

FIGS. 12A, 12B, and 12C illustrate examples of data which can be selected from the extracted data of FIG. 11 in accordance with content instructions;

FIGS. 13A, 13B, and 13C illustrate examples of the data of FIGS. 12A, 12B, and 12C formatted in accordance with various transmission format instructions to form input files.

DETAILED DESCRIPTION OF THE PREFERRED EMBODIMENTS

Hardware

The invention provides an interface between information originating from a hard copy document and a computer application unit which uses the information. The computer application unit can be a particular computer application program or a device which is controlled in accordance with instructions or information from the hard copy document. The invention also allows storing a copy of the hard copy document in a memory and retrieving the copy of the hard copy document. By providing a comprehensive and integrated system which can accommodate almost all of the possible uses of information contained on a hard copy document, the instant invention allows for a paperless office.

The invention includes hardware and software necessary to extract, retrieve, and process information from the hard copy document. A copy of the actual image of the hard copy document is stored in memory. Textual information extracted from the hard copy document is also stored in memory. Textual information is information, such as alphanumeric characters, which is recognized on the hard copy document and which is stored in a form which corresponds to the particular recognized character. For example, the extracted characters can be stored in the ASCII format in an electronic memory.

The user can have all of the information extracted from the hard copy document and stored in memory. Alternatively, the interface can interactively prompt the user to identify specific pieces of information for storage. The interface can also extract specific pieces of information using a predefined template. The interface can also prompt or receive from another information processing system or an applications program desired information, content instructions, and format instructions.

The instant invention also provides for parsing information extracted from the hard copy document and for directing this parsed information to specific users or application programs as an input file.

The invention also permits the user to define the transmission format of the input file for a particular computer application unit.

Figure 1:
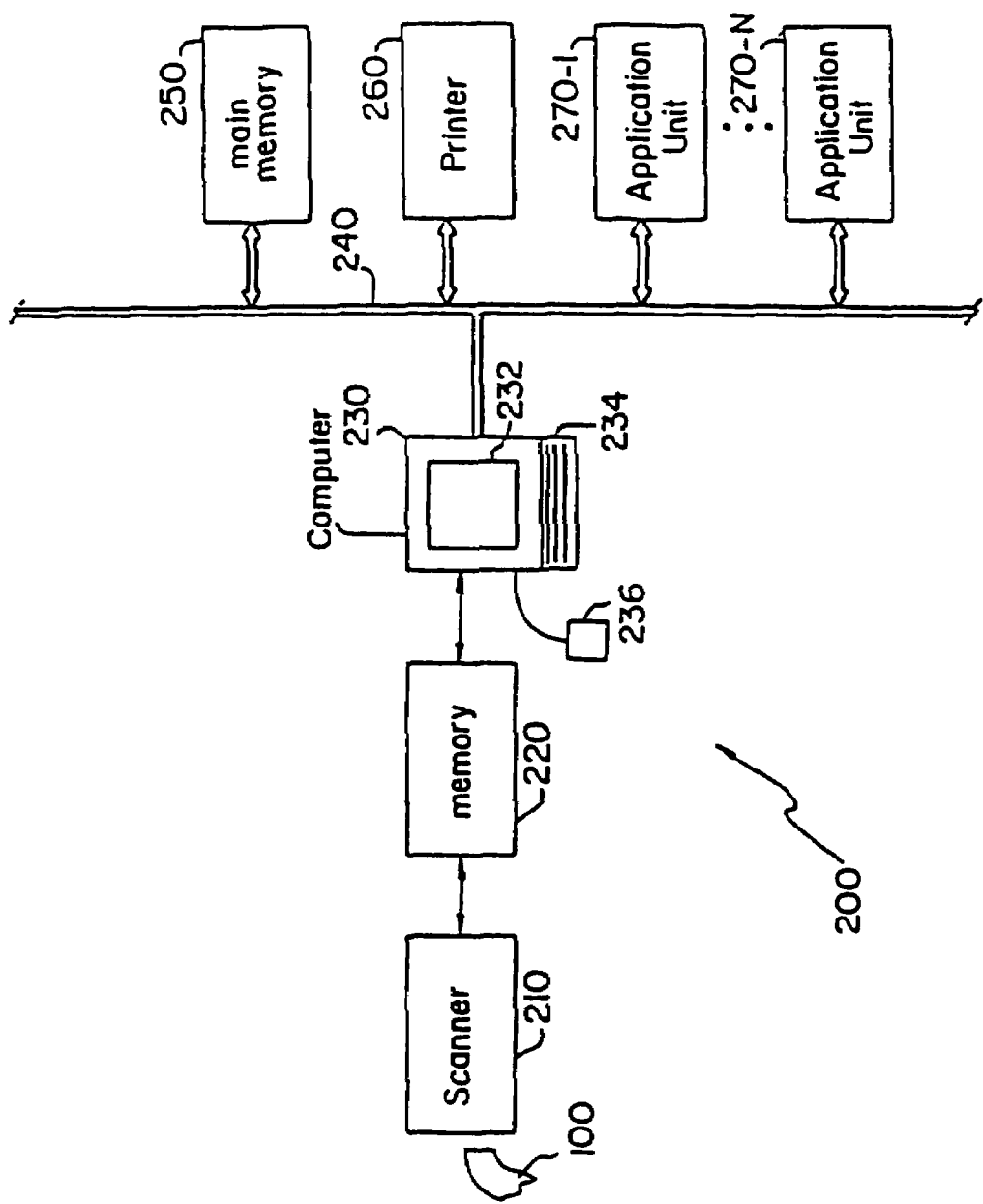
FIG. 1 illustrates hardware for implementing a preferred embodiment of the instant invention.

FIG. 1 illustrates hardware for implementing a preferred embodiment of a hard copy document to application program interface according to the instant invention. The interface 200 processes information extracted off of hard copy document 100 and provides information to application units 270 in a form required by each particular application unit. The interface extracts information off of a hard copy document 100 utilizing a scanner 210. The scanner 210 can be any type of scanner which extracts information off of hard copy documents, for example, an Optical Reader.

The scanned information is stored in a scanner memory 220 or in main memory 250, as will be described in greater detail below. If main memory 250 or another memory is available to store the scanned information, then scanner memory 220 can be omitted.

The information from scanner memory 220 or main memory 250 is transmitted to computer 230. In the preferred embodiment, computer 230 includes a display 232, a keyboard 234, and a mouse 236. The display 232 displays an image of the hard copy document itself and/or information necessary to process the information extracted off of the hard copy document.

The computer 230 is used to select portions of the stored document information contained in memory in accordance with content instructions which define portions of the stored document information required by an application unit. These content instructions may be provided by the application program. Alternatively, the content instructions can be inputted via an input device such as a keyboard, a touch screen, a mouse, a notepad, a voice recognition device, or the like.

The computer 230 is also used to format selected stored document information into the transmission format used by an application unit based on transmission format instructions. The transmission format instructions may be provided by the application program. Alternatively, the transmission format instructions can be inputted via a keyboard, a touch screen, a mouse, a notepad, a voice recognition device, or the like.

Thus, the computer 230 is used to generate an input file for a particular application unit. The computer 230 is connected to scanner memory 220, main, or permanent, memory 250, a printer 260, and application units 270, via a bus 240. Although FIG. 1 illustrates use of a bus to connect components together, it is understood that any routing or connecting link, implemented in hardware or software or both, can be employed instead of, or in addition to, a bus. Instructions to or in the computer 230 control the main memory 250, the printer 260, the application units 270, and the bus 240. Instructions to or in computer 230 can also control exchanges of information with scanner memory 220.

When the computer 230 generates an input file for a particular document, the computer 230 can send this input file directly to an application unit or can store this input file in the main memory 250 until required by an application unit. The main memory 250 may also optionally store a copy of the image information for the hard copy document and the textual information for the hard copy document. Thus, the image information and textual information from the hard copy document can be retrieved and printed out on printer 260. In addition, image and textual information stored in scanner memory 220 or in main memory 250 can be used to form additional input files at the time of input or at a later time, based on content instructions and transmission format instructions. Thus, the invention can, at the discretion of the user, eliminate the need to retain copies of hard copy documents, permitting a paperless office.

The application units 270 include particular application programs and devices which are controlled in accordance with information contained on hard copy document 100.

Figure 2:
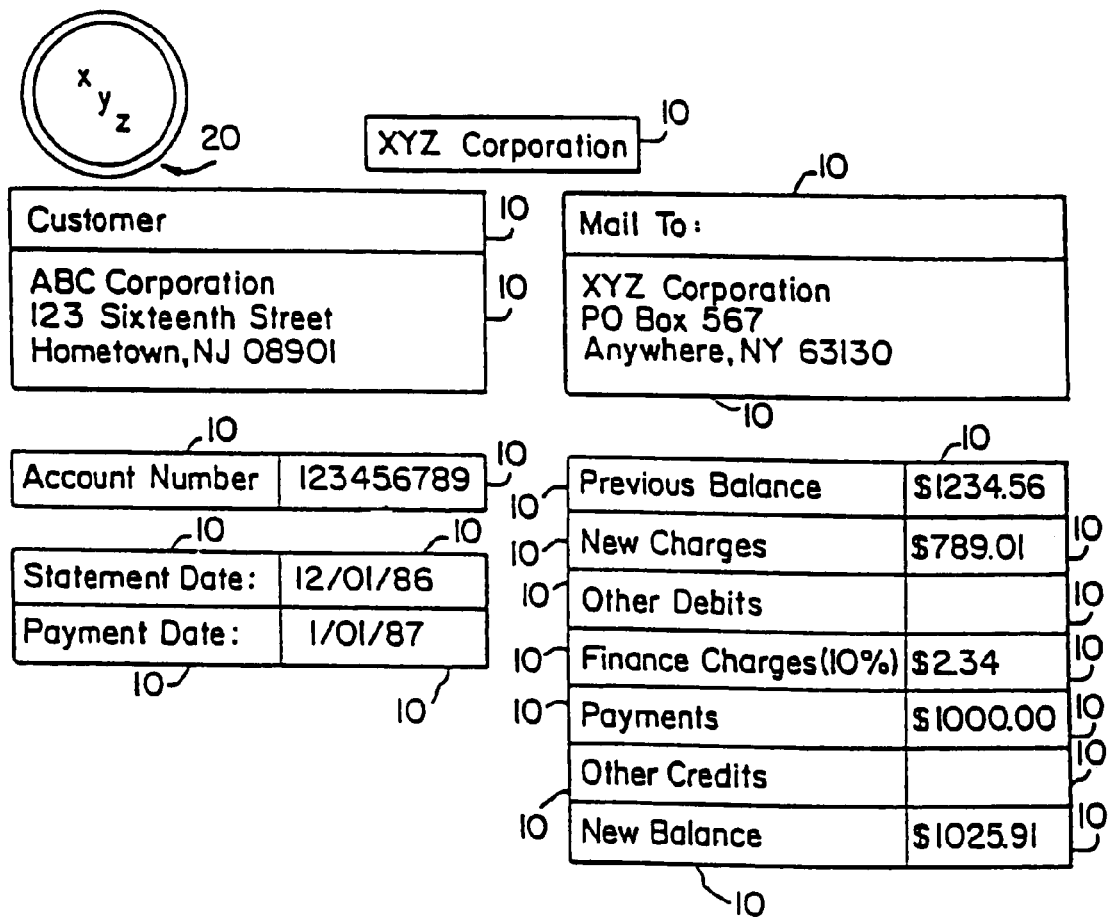
FIG. 2 illustrates an example of a hard copy document containing information to be processed by the instant invention.

FIG. 2 illustrates an example of a hard copy document 100 which contains information to be processed by the instant invention. The document illustrated in FIG. 2 is a bill from XYZ Corporation to customer ABC Corporation. FIG. 2 is only an example of a type of document that can be processed by the instant invention.

In a first operational mode, the scanner 210 stores all of the information extracted off of hard copy document 100 in the scanner memory 220 or, alternatively, in main memory 250. The extracted information is stored in two forms. The actual image of the hard copy document 100 is stored as image information in the scanner memory 220. In addition, the scanner memory 220 stores textual information recognized on the hard copy document 100 by, for example, employing standard character recognition software. In the preferred embodiment, the textual information is stored in ASCII format. The scanner memory 220 can be, for example, an electronic, magnetic, or optical memory.

Figure 3A:
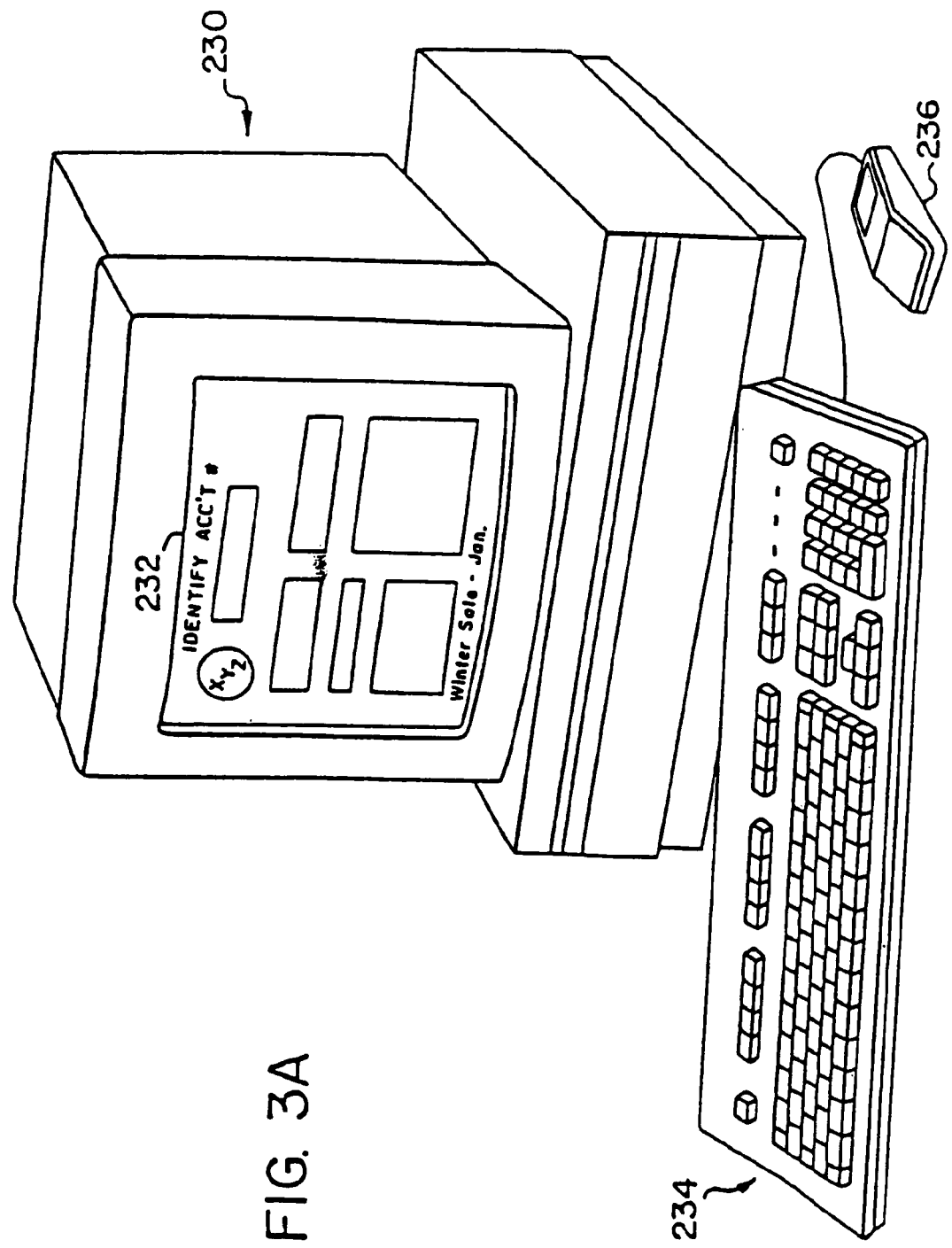
FIGS. 3A and 3B are enlarged views of the computer of FIG. 1 used to explain how the invention interactively prompts a user to identify information.

FIG. 3A illustrates an enlarged view of the computer 230 of FIG. 1. This view will be used to describe a second mode of operation. In this second mode of operation, the hard copy document 100 is scanned and a copy of the document 100 is displayed on display 232 of computer 230, based on the contents of information temporarily stored in scanner memory 220. After the document is displayed on display 232, the computer 230 interactively prompts the user to identify the location of specific pieces of information on the hard copy document. In the FIG. 3A illustration, this prompt message is indicated as the message beginning with the arrow.

For example, the prompt message can ask the user to identify the location of account number information on the hard copy document. The user then uses an input device, such as keyboard 234 or mouse 236 or a touch screen, notepad, voice recognition device, or other input device to position a cursor on the display to identify the location of the information requested by the prompt message. For example, the cursor could be used to define a block (which could be highlighted) containing the requested information, followed by a mouse "enter" click. In this example, the user would move the mouse to identify the location of the account number information contained on the hard copy document 100. The computer 230 then stores the information which has been identified by the user as account number information in the appropriate address or subfile or as the appropriate variable or parameter in memory. The computer then prompts the user to identify the location of other information on the hard copy document, such as, statement date information. The process proceeds until all of the desired information has been stored into the appropriate locations in memory.

Figure 3B:
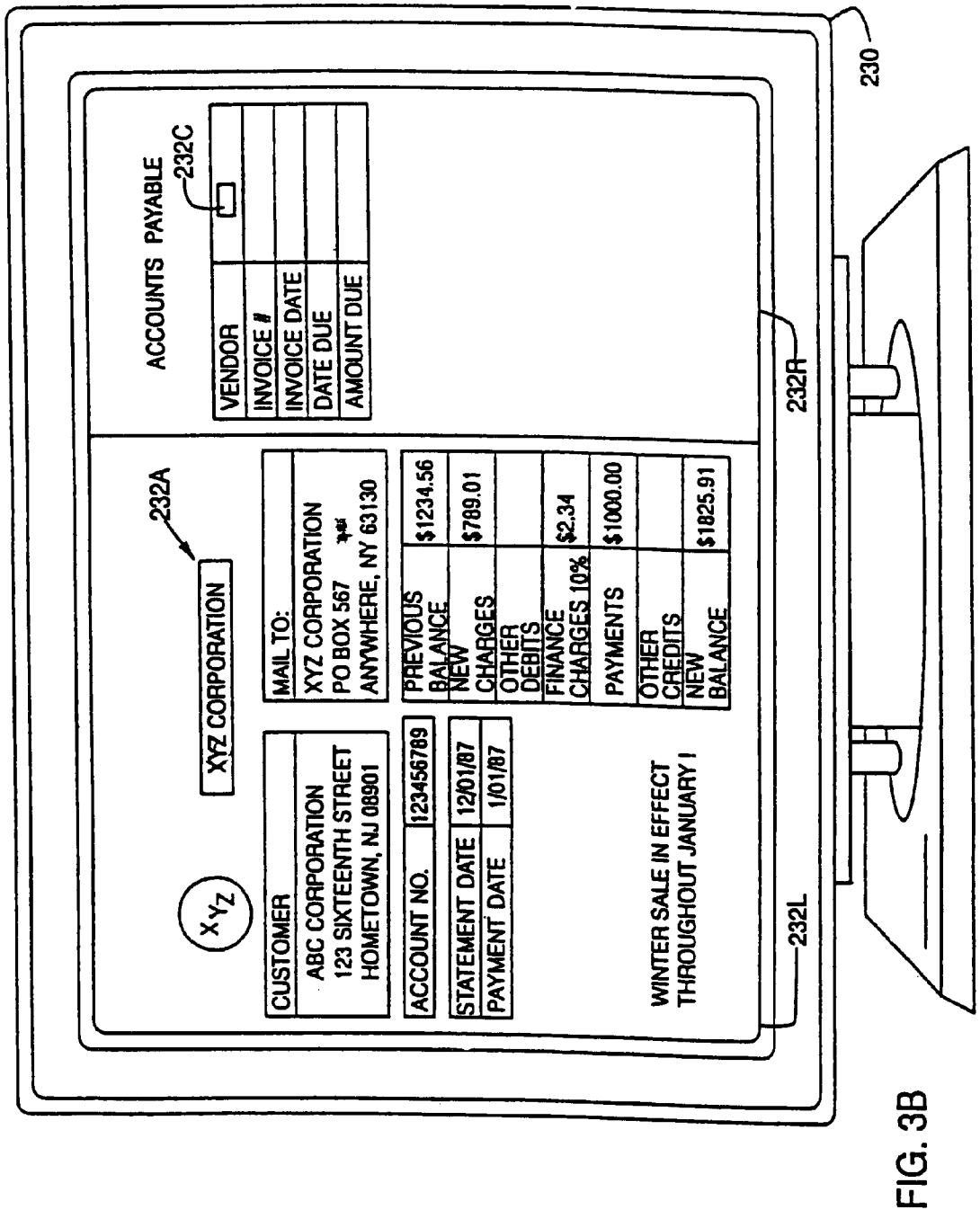

FIG. 3B illustrates a variation of the second mode for interactively prompting the user for information. In FIG. 3B, the display is split into two portions. A left-hand portion 232L displays the image of the hard copy document and a right-hand portion 232R displays the required application program information. For example, in FIG. 3B, portion 232R displays a spreadsheet used by an application program. While observing the split display, the user can input instructions to associate specific pieces of information on the hard copy document (for example, the vendor name indicated by the mouse arrow 232A) with particular subfiles in memory (for example, the vendor field next to which the cursor 232C appears), using a mouse or other input device(s) or both. The split display also allows the user to generate content format instructions while observing the information required for a particular application program on the right-hand portion.

These second modes of operation are efficient for small businesses which receive a small number of a wide variety of invoices, since the user does not necessarily have to store all of the information that appears on the hard copy document. A further advantage is that data input is quicker, easier, and more accurate than with previous keyboard methodology. In addition, by specifying the location on the hard copy document of information, the user may optionally create a template, to be described in further detail below, for each different type of invoice. This template is stored for future use when another hard copy document in the same format is received.

More specifically, instructions from computer 230 can direct the scanner 210 and scanner memory 220, and/or main memory 250, to scan and/or store only specific portions of hard copy document 100. After the interactive prompts required to obtain information for a desired application program, the unused information stored in scanner memory 220 or 250 can be erased. Further, scanning of a second identical document can be limited to only those portions of the document which contain needed information.

More specifically, in FIG. 2, the lines 10 drawn around certain portions of the document represent the areas which the user has previously identified as the portions of a document to be extracted by the scanner 210 and stored in scanner memory 220 and/or main memory 250. Since the logo 20 and the message 30 have not been identified as an area to be scanned and stored, these areas are not scanned and stored in subsequent documents. Since the user has previously associated each of the areas 10 with a specific subfile of information, e.g., the account number, the scanned information is stored in memory locations corresponding to that subfile.

Data Processing

Figure 4:
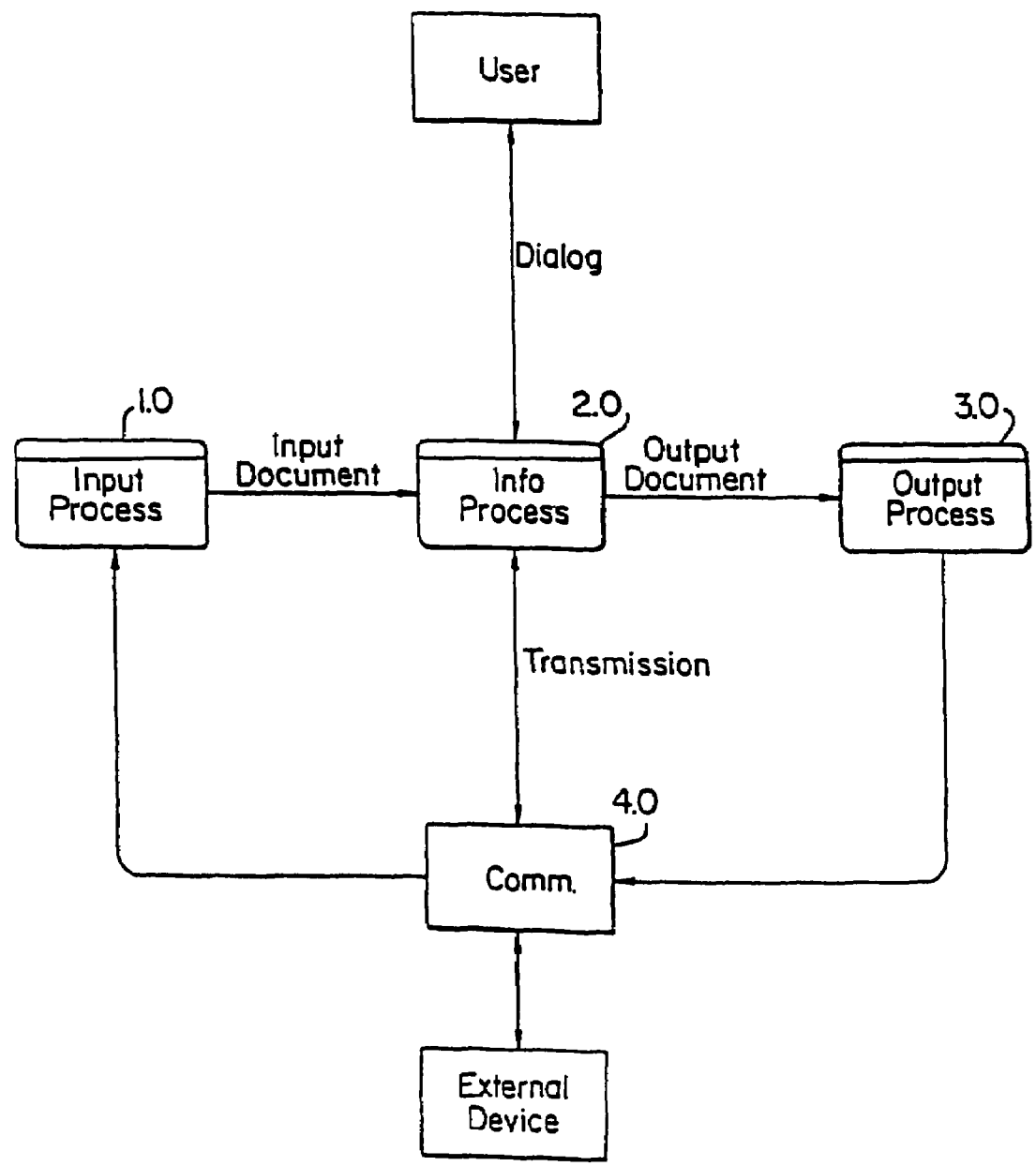
FIG. 4 is an overall data flow diagram for the FIG. 1 preferred embodiment.

FIGS. 4-10 illustrate the flow of data in the FIG. 1 preferred embodiment. FIG. 4 illustrates the overall data flow for the FIG. 1 preferred embodiment. The preferred embodiment includes an input process module 1.0, an information processing module 2.0, and an output processing module 3.0. The information processing module 2.0 is equipped to receive instructions from and transmit information to a user. The information processing module 2.0 can also transmit to and receive information from a remote external device through communication interface 4.0. Input process module 1.0 and output processing module 3.0 can also access communication interface 4.0. A module is implemented in hardware, software, or a combination of hardware and software. The specific implementation for a particular business application depends upon a variety of factors, for example, the relative costs of hardware and software implemented systems, the frequency with which a user will want to expand or modify the system, and the like.

Figure 5:
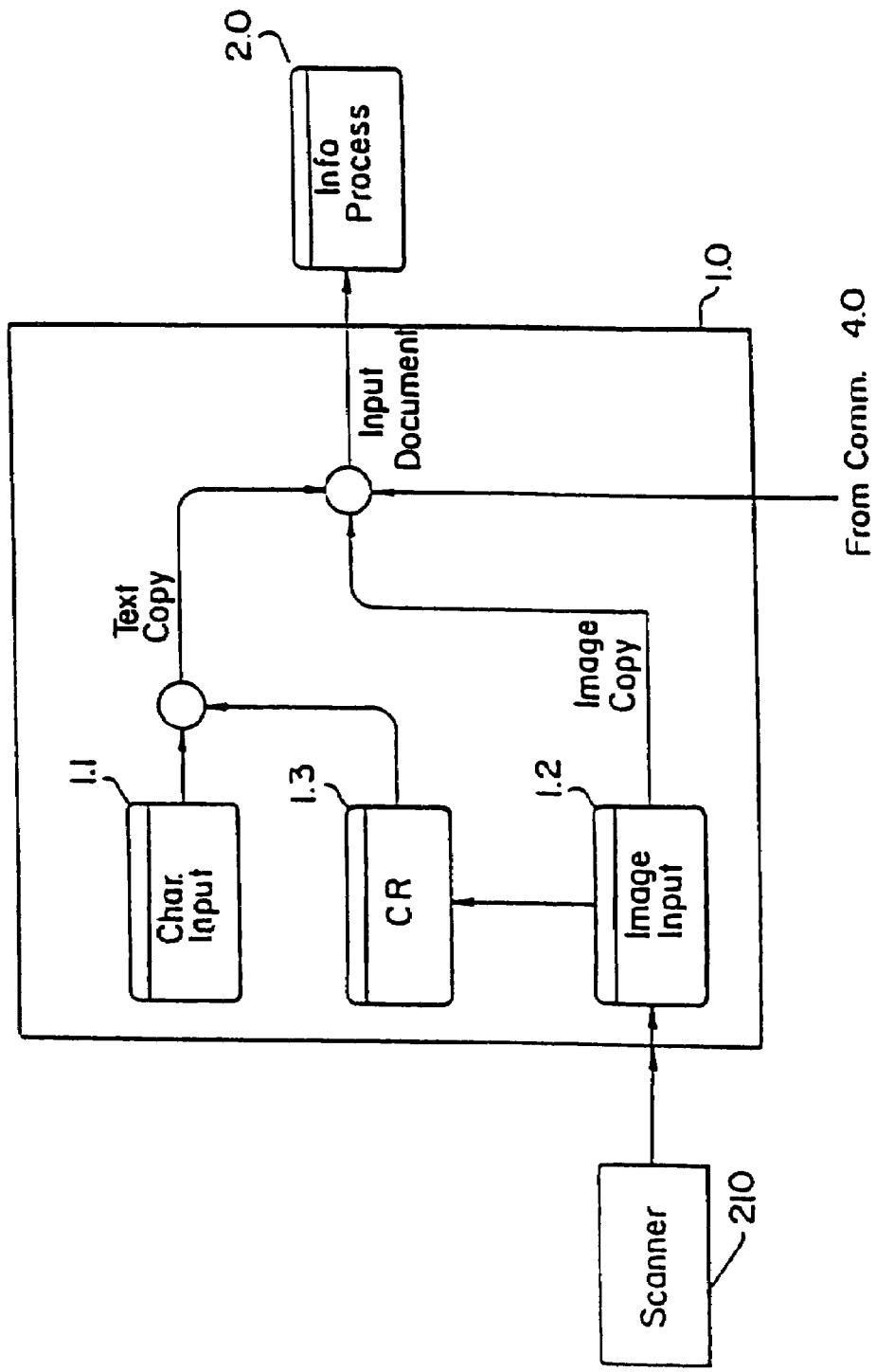
FIG. 5 is a detailed input data flow diagram for the FIG. 1 preferred embodiment.

FIG. 5 is a more detailed diagram of the input process module 1.0 of FIG. 4. The input process module 1.0 includes a character input module 1.1, an image input module 1.2, and, in the preferred embodiment, a character recognition device 1.3. The character input module inputs textual information, such as alphanumeric characters, from an input device such as keyboard 234. The image input module 1.2 inputs image information, for example, a digitized image of the actual appearance of hard copy document 100. Textual information can include textual input from an input device such as keyboard 234 and textual information extracted from the document by character recognition device 1.3. Both types of information comprise an input document which is transmitted to information processing module 2.0. In the FIG. 1 preferred embodiment, the processing performed by input process module 1.0 occurs in scanner memory 220, computer 230, and main memory 250.

Figure 6:
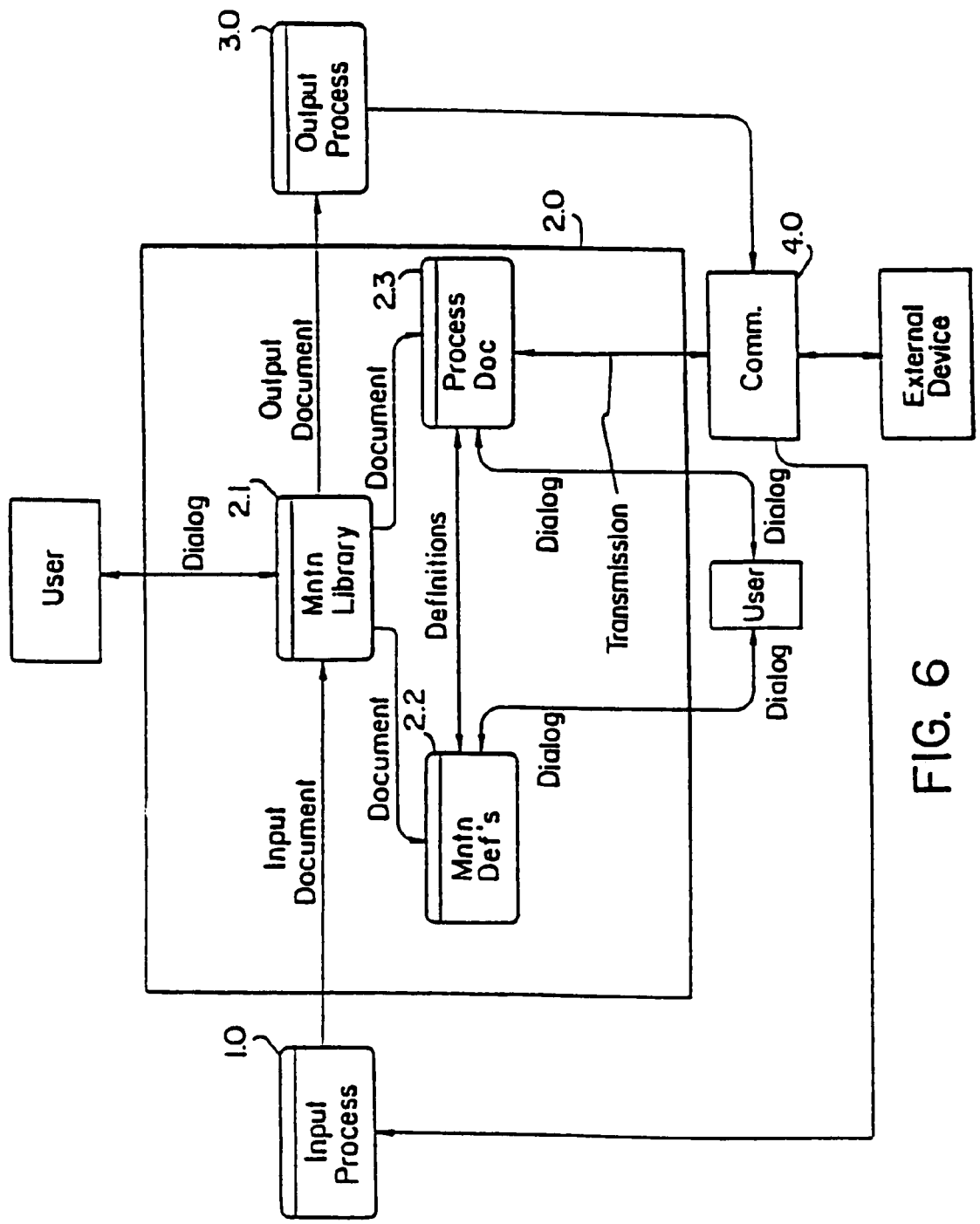
FIG. 6 is a detailed information processing data flow diagram for the FIG. 1 preferred embodiment.

FIG. 6 illustrates information processing is data flow for the FIG. 1 preferred embodiment, that is, FIG. 6 illustrates data flow in the information processing module 2.0.

The information processing module 2.0 includes a maintain library module 2.1, to be described in further detail below in conjunction with FIG. 7, a maintain definitions module 2.2, to be described in further detail below in conjunction with FIG. 8, and a process document module 2.3 to be described in further detail below in conjunction with FIG. 9.

The information processing module 2.0 is the module which coordinates and drives the entire system. In the preferred embodiment, the information processing module 2.0 is implemented primarily by computer 230.

Figure 7:
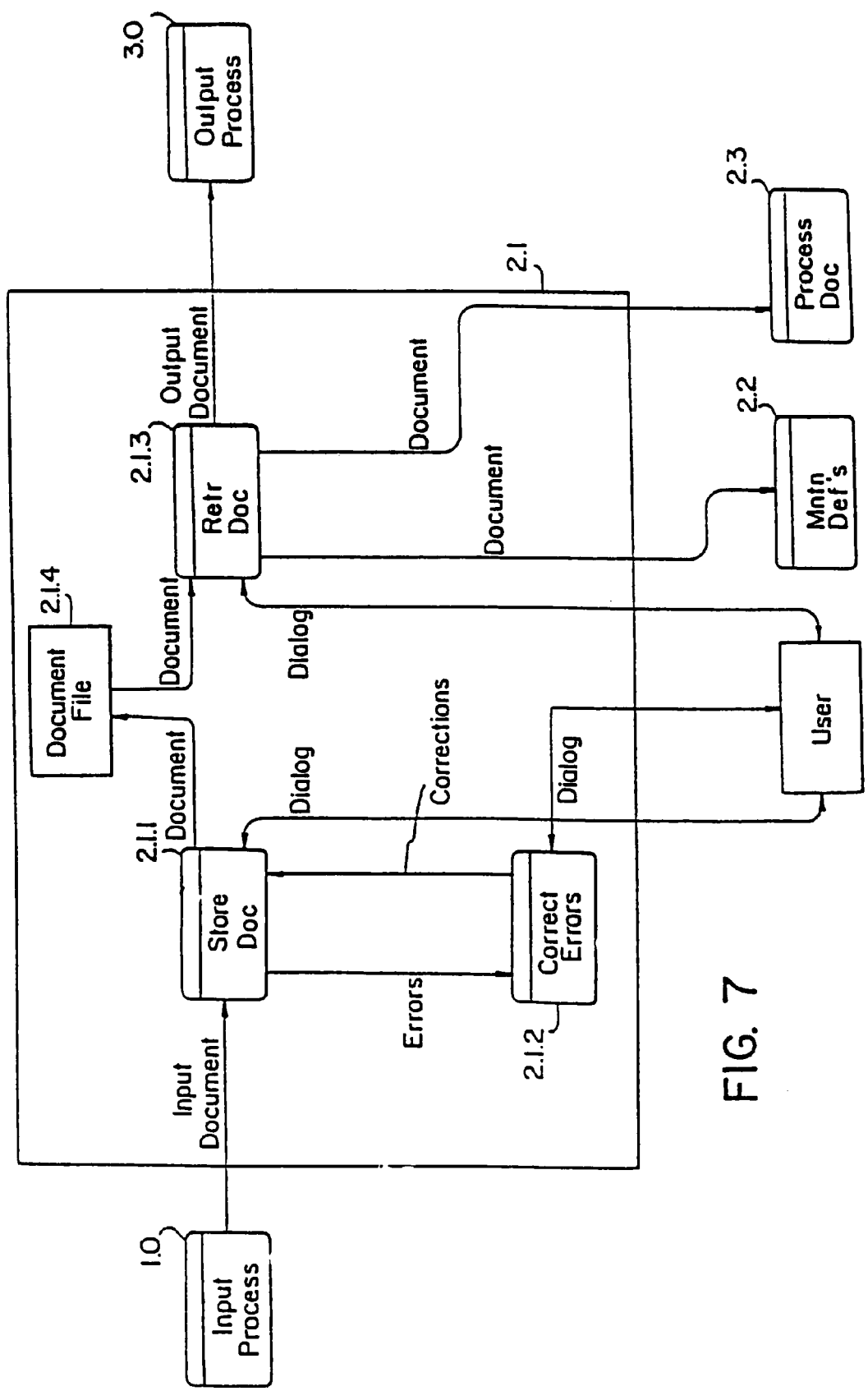
FIG. 7 is a more detailed information processing data flow diagram for the maintain library module of FIG. 6.

FIG. 7 illustrates information processing data flow in the maintain library module 2.1. The maintain library module 2.1 maintains a library of image information, for example, a digitized image representing the actual appearance of the hard copy document, and textual information of the hard copy documents for reference during processing. This library can be incorporated within scanner memory 220, main memory 250, or another independent memory, for example, a RAM disk. The maintain library module 2.1 includes a store document module 2.1.1, a correct errors module 2.1.2., a retrieve document module 2.1.3, and a document file 2.1.4. These modules operate collectively to store, retrieve, and correct document information.

The store document module 2.1.1, prior to routing the document to the document file 2.1.4, may provide information on recognition errors which may have occurred while inputting the document. For example, the store document module 2.1.1 identifies that a character contained on hard copy document 100 was not recognized. The store document module 2.1.1 also optionally causes a copy of the document and its parsing to be displayed on the display 232 for confirmation by the user. The user may utilize this opportunity to identify any errors in the displayed document and, in conjunction with the correct errors module 2.1.2, to revise the document's parsing, if necessary, prior to storage of the document in memory. The module 2.1.1 also provides a facility for the user to name a particular hard copy document for cataloging, storage, and retrieval purposes. After the document is named, the store document module 2.1.1 stores copies of the document in the document file 2.1.4.

The correct errors module 2.1.2 processes instructions from the user to correct errors identified by the store document module 2.1.1 and errors that have been spotted by the user during the confirmation process.

The retrieve document module 2.1.3 permits the user to retrieve a copy of a document previously stored in the document file 2.1.4. As described above, long-term storage is provided by main memory 250, if necessary.

Figure 8:
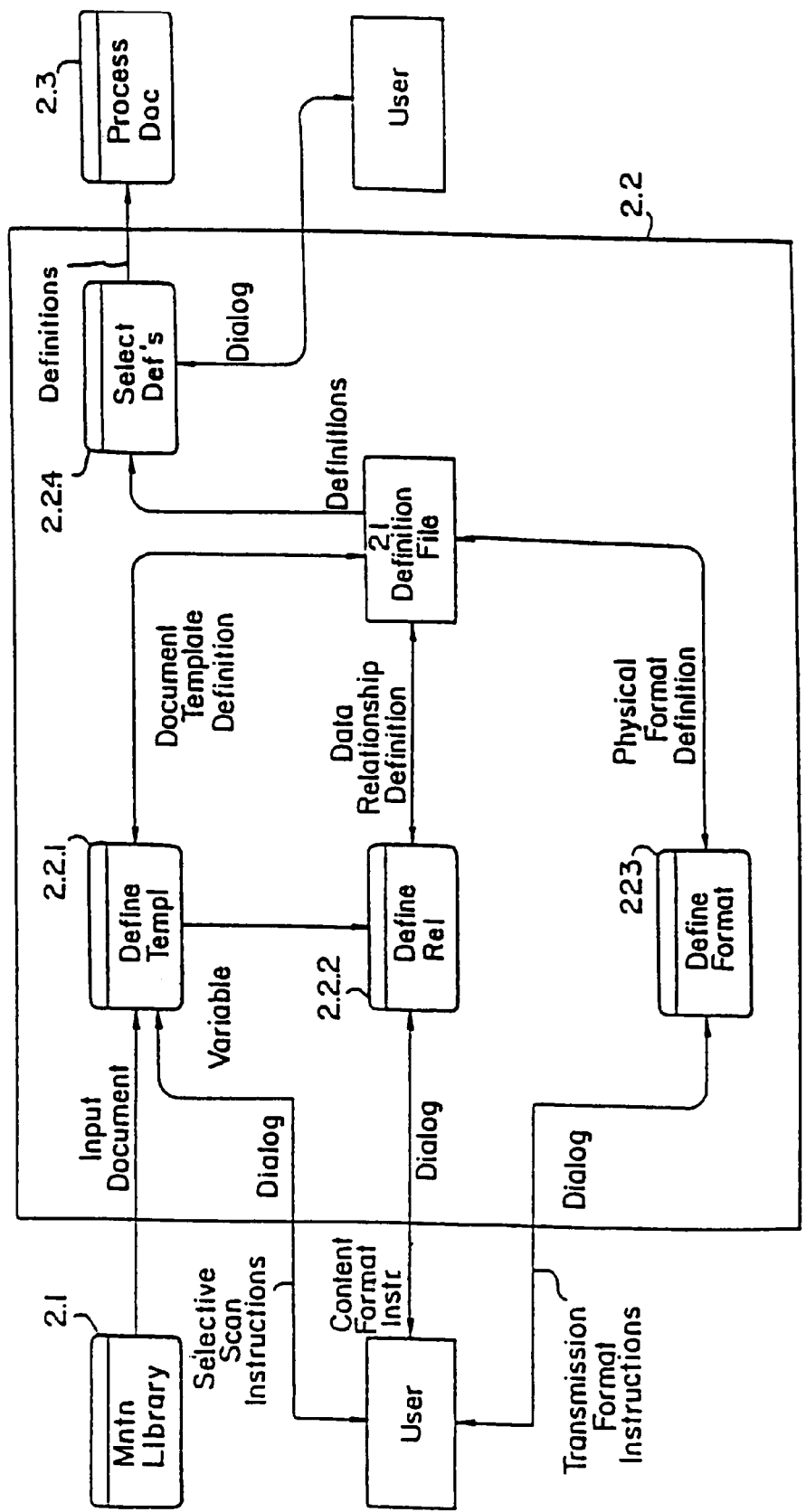
FIG. 8 is a more detailed information processing data flow diagram for the maintain definitions module of FIG. 6.

FIG. 8 illustrates a more detailed information processing data flow diagram for the maintain definitions module 2.2 of FIG. 6. The maintain definitions module 2.2 allows the user to define system and document parameters and maintains the definitions of these system and document parameters. The maintain definitions module 2.2 includes a define template module 2.2.1 which allows the user to specify the location of information on the document. This information provided by the user defines a template which is used to extract information off the document and to associate the extracted information with a particular variable or subfile. These templates are illustrated by boxes 10 in the FIG. 2 example of a hard copy document. The maintain definitions module 2.2 can also access templates previously defined by the user and stored in main memory 250. Templates can also be provided as part of software packages developed by program developers.

The maintain definitions module 2.2 also includes a define relationships module 2.2.2. The define relationships module 2.2.2 allows the user to define data relationships, or logical relationships, between pieces of information extracted from the hard copy document. These pieces of information are then used to generate an input file for a selected computer application unit. The user defines these relationships by content instructions. Alternatively, content instructions to define relationships can be provided by application software. If the user provides these content instructions, the content instructions are inputted via keyboard 234 or via another input device such as a notepad, a voice recognition device, or the like. Examples of content instructions, data, and logical relationships will be described in further detail in conjunction with FIGS. 11 and 12A, 12B, and 12C.

The maintain definitions module 2.2 also includes a define format module 2.2.3. The define format module 2.2.3 allows the user to define transmission formats for an input file which is then transmitted to a selected computer application unit. Selection of the transmission format of the input file is accomplished by the user through use of transmission format instructions. Alternatively, the applications software itself can generate its own transmission format instructions. When the user must specify transmission format instructions, the transmission format instructions are inputted via keyboard 234 or via another input device such as a notepad, a voice recognition device, or the like. A further description of various transmission formats will be provided below in conjunction with FIGS. 12A, 12B, 12C, 13A, 13B, and 13C.

A select definitions module 2.2.4 is also included in the maintain definitions module 2.2. The select definitions module 2.2.4 allows the user to store and select a set of definitions to be used for processing the document. The definitions identify pieces of information on the document by, for example, absolute location, variable location, or relative location, or by proximity to key words and/or symbols. These definitions are described in further detail below by way of an illustrative example.

Figure 9:
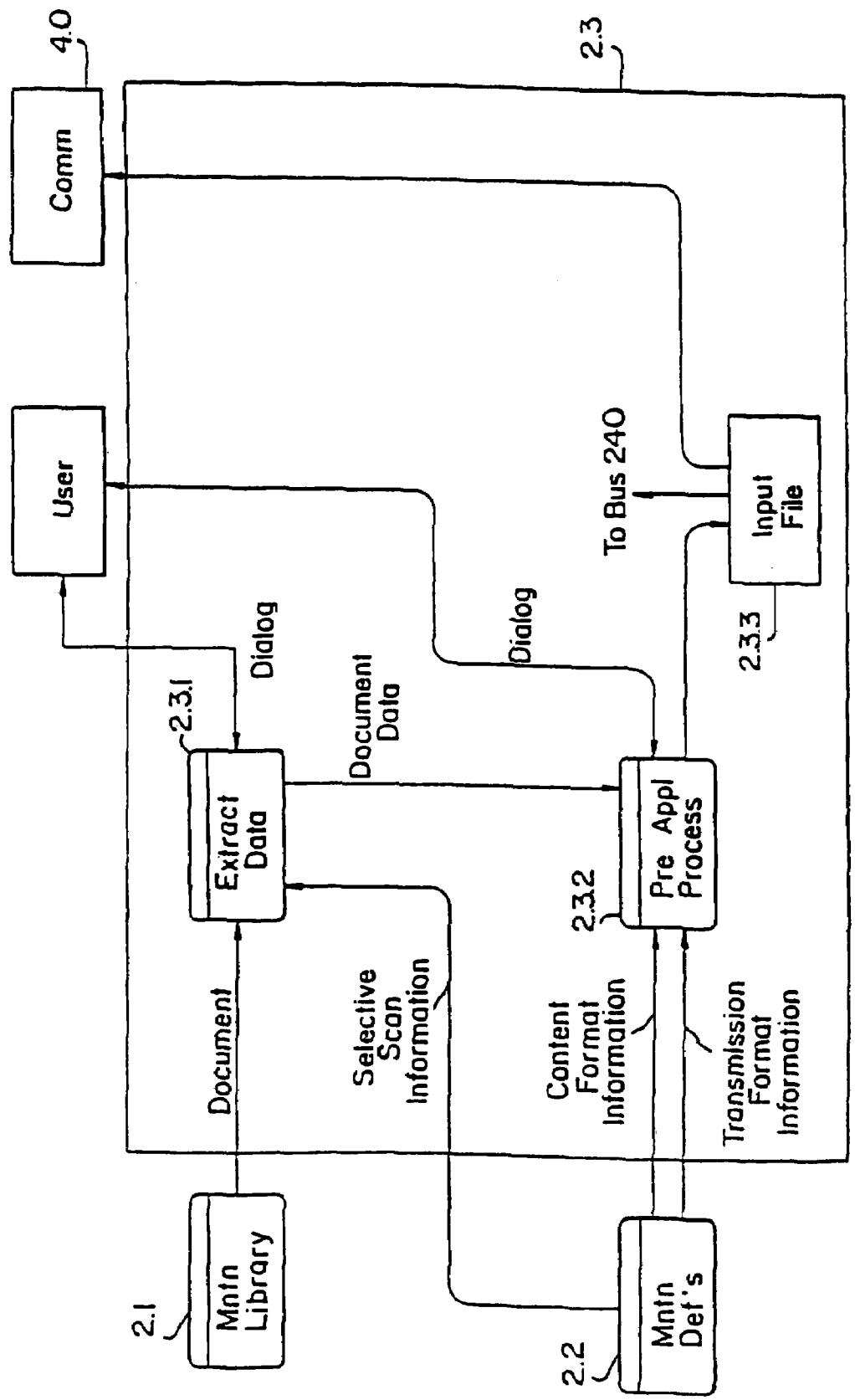
FIG. 9 is a more detailed information processing data flow diagram for the process document module of FIG. 6.

FIG. 9 illustrates a more detailed information processing data flow diagram for the process document module 2.3. The process document module 2.3 processes the document after the document has been stored in the system. The process document module 2.3 gathers the appropriate information which has been stored, and creates input file(s) 2.3.3 for the selected application unit. The process document module 2.3 then transmits the input file(s) via bus 240 and/or communication interface 4.0 to an application unit 270, an output device such as printer 260, or to main memory 250.

The process document module 2.3 includes an extract data module 2.3.1. This module extracts data off of the document in accordance with the user's instructions, for example, the user-defined template, or through the interactive mode.

The process document module 2.3 also includes a preapplication process module 2.3.2 which gathers and associates information extracted from the document in accordance with content instructions. This module prompts the user for any additional information required to satisfy the relationships defined by the content instructions. The preapplication process module 2.3.2 also places the selected information into the transmission format defined by the transmission format instructions.

The preapplication process module 2.3.2 also generates the input file 2.3.3 for the selected application in accordance with the appropriate instructions. The input file 2.3.3 is then transmitted to bus 240 and or communication interface 4.0 for transmission to a particular application unit 270.

Figure 10:
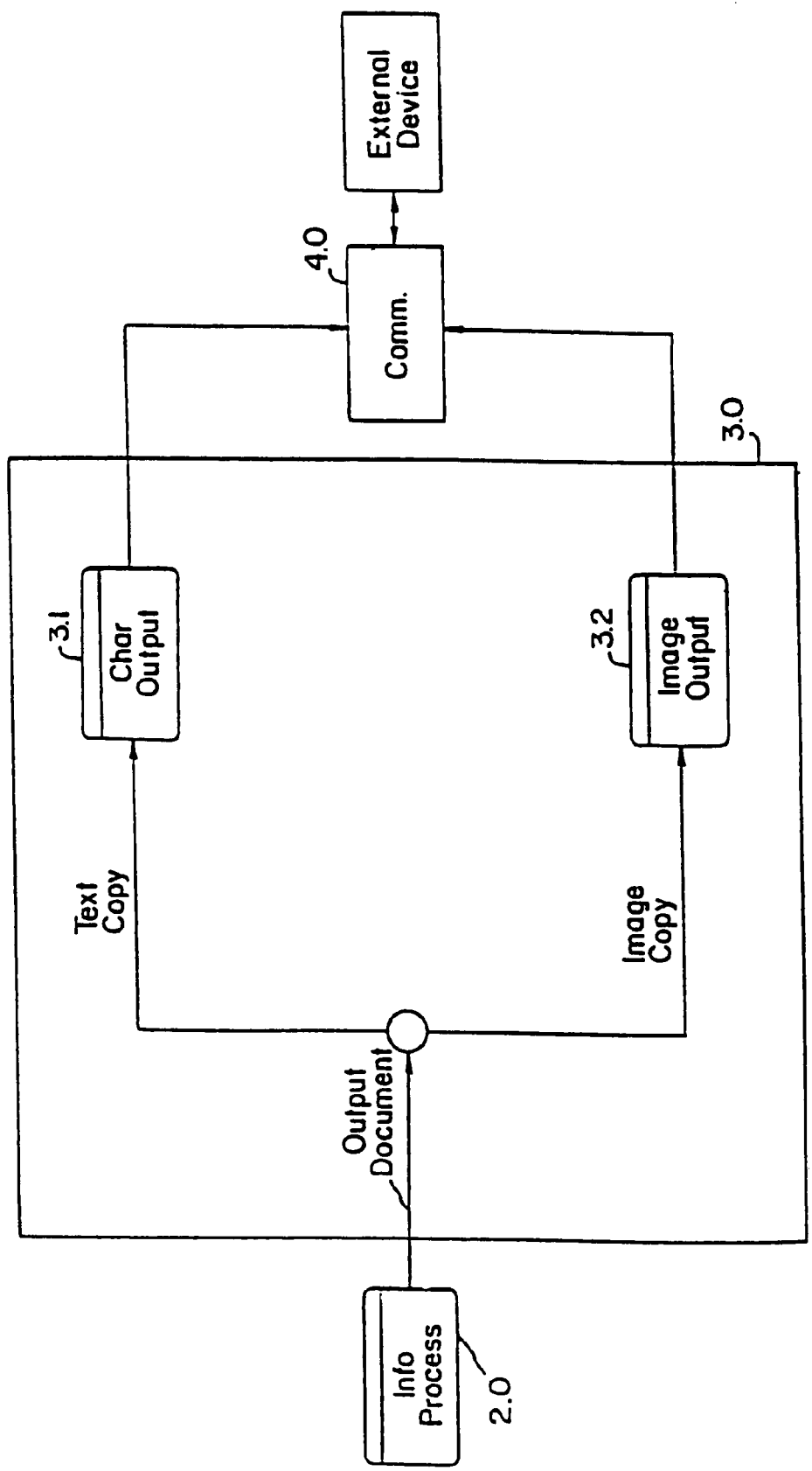
FIG. 10 is a detailed output data flow diagram for the FIG. 1 preferred embodiment.

FIG. 10 illustrates a detailed output data flow diagram for output module 3.0. Output module 3.0 outputs a textual and/or image copy of the document. In the FIG. 1 preferred embodiment, output module 3.0 is implemented by printer 260, associated software, and associated interface circuitry.

Operation

Examples of operation of a preferred embodiment will now be described.

The user enters the system by providing instructions to the information processing module 2.0. The user then instructs the information processing module 2.0 to conduct maintain library processing, maintain definitions processing, or process document processing.

If the user selects maintain library processing, the user then provides instructions to maintain or modify the document library through the maintain library module 2.1. For example, the user can direct the inputting and storage of a hard copy document 100 or can retrieve and output a document. The user requests inputting of a document through the store document module 2.1.1. The system then prompts the user to specify a storage location for the inputted document. The document is then read-in by the input process module 1.0. A textual copy and/or an image copy are stored into the document file 2.1.4. Errors which have occurred during inputting are identified and corrected by the correct errors module 2.1.2 and the user. The corrections are reflected in the document information stored in document file 2.1.4.

The retrieve document module 2.1.3 is used to retrieve and output a document. The system prompts the user to specify the storage location of a document and the type of document copy, for example, a textual or an image copy, to be outputted. The document is then outputted by the output process module 3.0.

If the user initially selected maintain definitions processing, the user would instruct the system to maintain and/or modify parameter definitions through the maintain definitions module 2.2. For example, the user can define and maintain a document template for extracting selected portions of information off of the hard copy document. The user can use the template to extract selected portions of information off of the hard copy document when the document is originally inputted, or alternatively, the user can use the template to identify selected portions of information for extraction off of an image copy of the document. In creating the template the user identifies pieces of information on the document to be extracted and assigns a variable name, or subfile, to each piece of data.

The location of data to be extracted can be defined in a number of ways other than by use of a template. For example, the user can designate the absolute location of information on the document with respect to a grid overlaid on the document, e.g., always on line 3, starting in column 1. The user can also identify information by specifying the relative location of information to be extracted, e.g., always two lines below the piece of data named "salutation", starting in column 3. The user can also specify the location of information to be extracted by variable location specification. For example, if the hard copy document is a letter, the module would conduct a key word search for the term "Dear Sir:". Wherever this term "Dear Sir:" is located, this piece of data would be associated with the variable specified by the user, for example, the variable "salutation." In addition, a defined set of conventional symbols can be used to signify certain recurring data items for the convenience of users of the instant invention. For example, a "@" symbol can be used to delineate the vendor name as follows: "@XYZ Corporation@". Other examples of the use of symbols to delineate information will be described with reference to FIG. 14.

The maintains definition module 2.2 is also used to maintain data relationships in accordance with content instructions and to maintain input file formats in accordance with transmission format instructions. Relationships are defined and maintained between pieces of data, specified by, for example, the names of variables, through the define relationships module 2.2.2. The names of pieces of data on the document are retrieved by, for example, the define template module 2.2.1, and are passed to the define relationships module 2.2.2. The user may then provide any additional pieces of data needed to generate an input file for a particular application program or unit, such as an input file line number. The user, the applications software, and/or instructions previously stored in memory then establishes the contents of the input file by defining relationships between pieces of data using content instructions. Specific examples of content instructions will be discussed below in conjunction with FIGS. 11, 12A, 12B, 12C, 13A, 13B, and 13C.

The user and/or the applications software defines and maintains the transmission format of the input file to be used by a particular application program or unit through the define format module 2.2.3 in accordance with transmission format instructions. This is accomplished by defining the parameters to be used by the preapplication process module 2.3.2 in generating an input file. Parameters which would typically be required to generate an input file would include the character type, e.g., text or pixel; delimiters used between pieces of data, e.g., a slash or a semicolon; end of line characters, e.g., a carriage return or a line feed; and end of file characters. Examples of transmission formats will be described in further detail below in conjunction with FIGS. 11, 12A, 12B, 12C, 13A, 13B, and 13C.

If the user initially selected process document processing, the interface will then proceed to process the document through use of the process document module 2.3. For example, the user can extract specific portions of data from an image copy of a document, can generate an input file for transmission to an application program, or can directly process information interactively with an application program.

If the user desires to extract specific portions of data from an image copy of a hard copy document which has already been stored in memory, the user uses the extract data module 2.3.1 to identify a document to be processed. The document is then retrieved by the retrieve document module 2.1.3 and passed to the extract data module 2.3.1. The user can also select parameter definitions through the select definitions module 2.2.4.

The selected document template or parameter definition is passed to the extract data module 2.3.1. The extract data module 2.3.1 extracts pieces of data from the image copy of the document, as defined by the document template definition or the parameter definitions or both. This document data is then passed to preapplication process module 2.3.2.

The interface generates input file(s) 2.3.3 by use of the preapplication process module 2.3.2. The selected data relationship definition, as defined by the content instructions, and the selected record format definitions, as defined by the transmission format instructions, are passed to the preapplication process module 2.3.2. The preapplication process module 2.3.2 assembles the input file in accordance with the content instructions. The preapplication process module 2.3.2 also prompts the user for any additional pieces of data which need to be provided by the user. The input file is converted to the desired transmission format in accordance with the transmission format instructions. This physically formatted data is then stored in the input file 2.3.3.

The user can also use an application program to process information by loading the particular application program into the computer 230 rather than by sending the input file to a remote application unit 270.

An illustrative example of the processing described above will now be described.

The user inputs instructions via keyboard 234 or another input device which indicate that the user desires to input and store a document. The computer 230 then prompts the user for the name of the document. In this example, the user desires to input the document of FIG. 2 and therefore names the document "XYZ Corp. Bill Dec. 1, 1986." The computer then prompts the user to feed the hard copy document 100 into the scanner 210. The image of the hard copy document is displayed on display 232. The computer then prompts the user to identify the account number on the document. By use of the mouse 236 or other input device to position a cursor on the display, the user indicates the location of the account number. The account number is then read-in to a subfile named "Account Number." This process proceeds until all of the desired information has been read-in and stored.

In this particular example, no errors were encountered while inputting the document. The user then directs that the document be stored for future reference in a document file.

Some time later, the user desires to retrieve and output the document and to generate input files based on information from the document. The computer 230 prompts the user for the name of the document and the type of output. The user responds with "XYZ Corp. Bill Dec. 1, 1986" for a printed textual copy. The document is then retrieved from the document file and passed to the printer 260 for printing.

In order to generate an input file for a specific application program, the user selects the option to define a document template for use when each month's XYZ corporation bill arrives. Accordingly, the user instructs the system to display a copy of an XYZ corporation bill on the display 232. The user then identifies pieces of data by absolute locations. That is, the user assigns specific names to information located at specific portions of the document. In this example, the user would input the following information:

Vendor-text, line 1, one line, column 1, 80 characters;

Account number-numeric, line 6, one line, column 25, 9 characters;

Statement date-date, line 9, one line, column 25, 8 characters;

Payment date-date, line 11, one line, column 25, 8 characters;

Previous balance-currency, line 7, one line, column 75, 9 characters;

New charges-currency, line 8, one line, column 75, 9 characters;

Other debits-currency, line 10, one line, column 75, 9 characters;

Finance charges-currency, line 12, one line, column 75, 9 characters;

Payments-currency, line 13, one line, column 75, 9 characters;

Other credits-currency, line 14, one line, column 75, 9 characters;

New balance-currency, line 15, one line, column 75, 9 characters.

The user also identifies data with variable locations. In this particular example, a variable location is specified as follows:

Heading 2-line, value="Mail To:"

The identification of Heading 2 as line information means that the system will search for occurrences of the character string "Mail To:" and assign the line number which contains this character string to Heading 2.

The user also identifies data by relative locations. In this example, the user identifies the following relative location:

Mail To-text, Heading 2+1, 3 lines, column 60, 25 characters per line.

The instructions above instruct the system to assign the textual information beginning on one line after Heading 2 and continuing for 3 lines, in column 60, to the Mail To subfile.

As an alternative to inputting the actual line, column, and character numbers, the user can identify desired portions of the document by blocking, or highlighting, the desired portions using the mouse or other input device. In this case, the computer converts the highlighted portions into corresponding line, column, and character numbers.

FIG. 11 lists data corresponding to the hard copy document of FIG. 2 and the associated variable or subfile names.

Next, the user desires to define data relationships in accordance with content instructions. Examples of the type of contents which can be specified by a user are illustrated in FIGS. 12A, 12B, and 12C.

In this particular example, three separate departments of ABC Corporation require information from the XYZ Corporation bill. The first department requires vendor, account number, statement date, payment date, previous balance, new charges, debits, finance charges, payments, and new balance information. The second and third departments require mail to information and previous balance information. Each of these departments have their own application program which utilizes this information.

The user employs content instructions to designate how pieces of information, which have been extracted off of hard copy document 100, are directed to particular departments, that is, particular application programs. FIG. 12A illustrates the contents of the information to be transmitted to the first department. FIG. 12B illustrates the information to be transmitted to the second department. FIG. 12C illustrates the information to be transmitted to the third department. The content instructions, therefore, parse the information shown in FIG. 11 to various application programs, as shown by FIGS. 12A, 12B, and 12C. Content instructions can also be used to identify additional pieces of data which are required for the input files of the particular application programs. In this particular example, the specific application programs from the three departments all require numeric record number information, numeric horizontal position information, numeric vertical position information, and date received information. The horizontal and vertical position information is used by the application program to specify the location of the received information on a spreadsheet application program, in this example. The user may know in advance the content format required by each application program, that is, in this example, the location and type of information specified on the spreadsheet. The user may also employ the split display mode described with reference to FIG. 3B to generate content format instructions.

Using the content instructions, the user establishes the following contents for the input file corresponding to FIG. 12A:

Record number, horizontal position, vertical position, vendor;

Record number, horizontal position, vertical position, account number;

Record number, horizontal position, vertical position, statement date;

Record number, horizontal position, vertical position, date received;

Record number, horizontal position, vertical position, payment date;

Record number, horizontal position, vertical position, previous balance;

Record number, horizontal position, vertical position, new charges;

Record number, horizontal position, vertical position, finance charges;

Record number, horizontal position, vertical position, payments;

Record number, horizontal position, vertical position, new balance.

Next, transmission format instructions are employed to define the transmission format of the input file for a specific application program or unit. FIG. 13A illustrates the transmission input file corresponding to FIG. 12A. FIG. 13B illustrates the transmission input file corresponding to FIG. 12B. FIG. 13C illustrates the transmission input file corresponding to FIG. 12C. A comparison of FIGS. 12B and 12C reveals that FIGS. 12B and 12C have the same contents. However, the information illustrated in FIG. 12B is being sent to a different application program than the information in FIG. 12C. These application programs require different transmission input formats, as illustrated in FIGS. 13B and 13C. More specifically, the application program that receives the input file illustrated in FIG. 13B uses the greater than sign as a delimiter whereas the application program which receives the transmission input file shown in FIG. 13C uses a back-slash as the delimiter.

After the contents and the transmission format for the input file have been defined, and any additional information has been inputted, the input file is assembled and transmitted to the particular application program.

Figure 14:
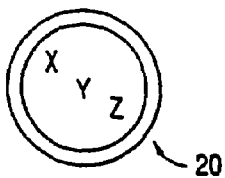
FIG. 14 illustrates another example of a hard copy document containing information to be processed by the instant invention.

FIG. 14 illustrates another example of a hard copy document containing information to be processed by the instant invention. The hard copy document illustrated in FIG. 14 is first scanned and information from the hard copy document is stored into a memory. The interface 200 then identifies portions of the hard copy document corresponding to various variables by recognizing a defined set of symbols. In the FIG. 14 example, triangles delineate the mailing address, circles delineate the statement date, and squares delineate the new charges. Information from these portions of the hard copy document is stored in the corresponding memory locations or subfiles for each variable. The same set of symbols can be used to identify the same information from one document to the next. Thus, even if the physical formats of documents are not fixed from one document to the next, a diversity of hard copy documents can be processed without manually inputting data by recognition of the defined symbols.

Examples of readily available application programs are Quicken and Lotus 1,2,3 both of which are widely utilized in the business community. Quicken, for example is an easy-to-utilize program for writing checks and preparing business records. Payee, amount and address information may readily be transmitted from scanner memory 220 and/or main memory 250 to the Quicken application program for check writing functions and ledger keeping purposes. Lotus is a well known spreadsheet program which may process data input into specified cells once this data is placed in conventional Lotus format.

Thus, the instant invention provides an integrated and comprehensive system for handling information from a hard copy document, thus permitting a paperless office. In addition, the invention permits data, extracted off of a hard copy document, to be easily manipulated into various logical and transmission formats required by a particular application unit. The invention also provides a low cost system for inputting information from a wide variety of hard copy documents into a memory.

The foregoing description has been set forth merely to illustrate preferred embodiments of the invention and is not intended to be limiting. Modifications are possible without departing from the scope of the invention.

For example, letters, checks, forms, pictures, reports, music scores, film, and other types of hard copy documents can be processed by the invention for accounts payable/receivable accounting, inventory control, record keeping, budgeting, data base management, music transcription, forms processing, computerized art, survey and questionnaire processing, statistical data analysis, correspondence processing and other applications.

Other automated digitizing units can be used in addition to or as an alternative to use of the scanner 210 as an input unit. Any electrical, magnetic, or optical device which extracts information off of a hard copy document, thereby eliminating the need to manually input significant amounts of information from the hard copy document is suitable for use as an automated digitizing unit. In addition, information can be input by user responses and digital and analog signals generated from various devices, and from computer files from other computer systems. Suitable hardware for inputting data includes a keyboard, a light pen, a mouse, a touch screen, a laser scanner, a microphone, a tablet, a disk drive, a magnetic tape drive, and a modem.

The interface 200 can also output information in forms other than a hard copy of textual or image information. For example, the interface 200 can output system responses, computer files, and digital and analog signals for transmission to other computer systems or to control systems. Suitable hardware for outputting information includes a disk drive, a magnetic tape drive, a cathode ray tube, a plasma screen, a printer, a plotter, a film developer, an amplifier, and a modem.

Since modifications of the described embodiments incorporating the spirit and substance of the invention may occur to persons skilled in the art, the scope of the invention should be limited solely with respect to the appended claims and equivalents.

What is claimed:

1. A method of processing information operating on a first computer system comprising at least one computer, which comprises:
   a. receiving a file by transmission from another computer system external to said first computer system and automatically displaying said file on a computer display as a template;
   b. automatically selecting and extracting information from said file according to content instructions;
   c. providing utilities capable of automatically routing the extracted information as input information to an unrestricted diversity of application programs operating on a computer system external to said first computer system according to customizable transmission format instructions tailored to enable correct processing of the input information by any application program that requires said input information;
   d. transmitting said input information to each application program requiring said input information; and
   e. automatically processing said input information by said each application program.

2. A method as claimed in claim 1 wherein said file is derived from scanning a hard copy document.

3. A method as claimed in claim 1 wherein said file is not derived from scanning a hard copy document.

4. A method as claimed in claim 1 wherein said file comprises a computerized form document.

5. A method as claimed in claim 2 wherein said file comprises a computerized form document.

6. A method as claimed in claim 3 wherein said file comprises a computerized form document.

7. A method as claimed in claim 4 wherein said computerized form document is filled in with information interactively input by a user on a computer.

8. A method as claimed in claim 5 wherein said computerized form document is filled in with information interactively input by a user on a computer.

9. A method as claimed in claim 6 wherein said computerized form document is filled in with information interactively input by a user on a computer.

10. A method of doing business operating on a first computer system comprising at least one computer to enable a commercial transaction between a buyer and a seller, which comprises:
    a. receiving a file by transmission from another computer system external to said first computer system and automatically displaying said file on a computer display as a template;
    b. automatically selecting and extracting information from said file according to content instructions;
    c. providing utilities capable of automatically routing the extracted information as input information to an unrestricted diversity of application programs operating on a computer system external to said first computer system according to customizable transmission format instructions tailored to enable correct processing of the input information by any application program that requires said input information;
    d. transmitting said input information to each application program requiring said input information; and
    e. automatically processing said input information by said each application program,
    wherein at least one of said unrestricted diversity of application programs causes the buyer to be automatically billed for said enabled commercial transaction.

11. A method of doing business as claimed in claim 10 wherein said file is derived from scanning a hard copy document.

12. A method of doing business as claimed in claim 10 wherein said file is not derived from scanning a hard copy document.

13. A method of doing business as claimed in claim 10 wherein said file comprises a computerized form document.

14. A method of doing business as claimed in claim 11 wherein said file comprises a computerized form document.

15. A method of doing business as claimed in claim 12 wherein said file comprises a computerized form document.

16. A method of doing business as claimed in claim 13 wherein said computerized form document is filled in with information interactively input by a user on a computer.

17. A method of doing business as claimed in claim 14 wherein said computerized form document is filled in with information interactively input by a user on a computer.

18. A method of doing business as claimed in claim 15 wherein said computerized form document is filled in with information interactively input by a user on a computer.

19. A plurality of computer systems, each comprising at least one computer, the plurality of computer systems comprising:
    a. means operating on a first computer system to receive a file by transmission from another computer system external to said first computer system and automatically display said file on a computer display as a template;
    b. means operating on said first computer system to automatically select and extract information from said file according to content instructions;
    c. means capable of operating on said first computer system to automatically route the extracted information as input information to an unrestricted diversity of application programs operating on a computer system external to said first computer system according to customizable transmission format instructions tailored to enable correct processing of the input information by any application program that requires said input information;

d. means operating on said first computer system to transmit said input information to each application program requiring said input information; and e. means operating on a computer system external to said first computer system to automatically process said input information with said each application program requiring said input information to enable a commercial transaction between a buyer and a seller.

20. A plurality of computer systems as claimed in claim 19 wherein said file is derived from scanning a hard copy document.

21. A plurality of computer systems as claimed in claim 19 wherein said file is not derived from scanning a hard copy document.

22. A plurality of computer systems as claimed in claim 19 wherein said file comprises a computerized form document.

23. A plurality of computer systems as claimed in claim 20 wherein said file comprises a computerized form document.

24. A plurality of computer systems as claimed in claim 21 wherein said file comprises a computerized form document.

25. A plurality of computer systems as claimed in claim 22 wherein said computerized form document is filled in with information interactively input by a user on a computer.

26. A plurality of computer systems as claimed in claim 23 wherein said computerized form document is filled in with information interactively input by a user on a computer.

27. A plurality of computer systems as claimed in claim 24 wherein said computerized form document is filled in with information interactively input by a user on a computer.

28. A plurality of computer systems, each comprising at least one computer, the plurality of computer systems comprising:

a. means operating on a first computer system to receive a file by transmission from another computer system external to said first computer system and automatically display said file on a computer display as a template;

b. means operating on said first computer system to automatically select and extract information from said file according to content instructions, the information not originating from a hard copy document;

c. means capable of operating on said first computer system to automatically route the extracted information as input information to an unrestricted diversity of application programs operating on a computer system external to said first computer system according to customizable transmission format instructions tailored to enable correct processing of the input information by any application program that requires said input information;

d. means operating on said first computer system to transmit said input information to each application program requiring said input information; and e. means operating on a computer system external to said first computer system to automatically process said input information with said each application program requiring said input information to enable a commercial transaction between a buyer and a seller.

* * * * *